United States Patent Office 3,614,900
Patented Oct. 26, 1971

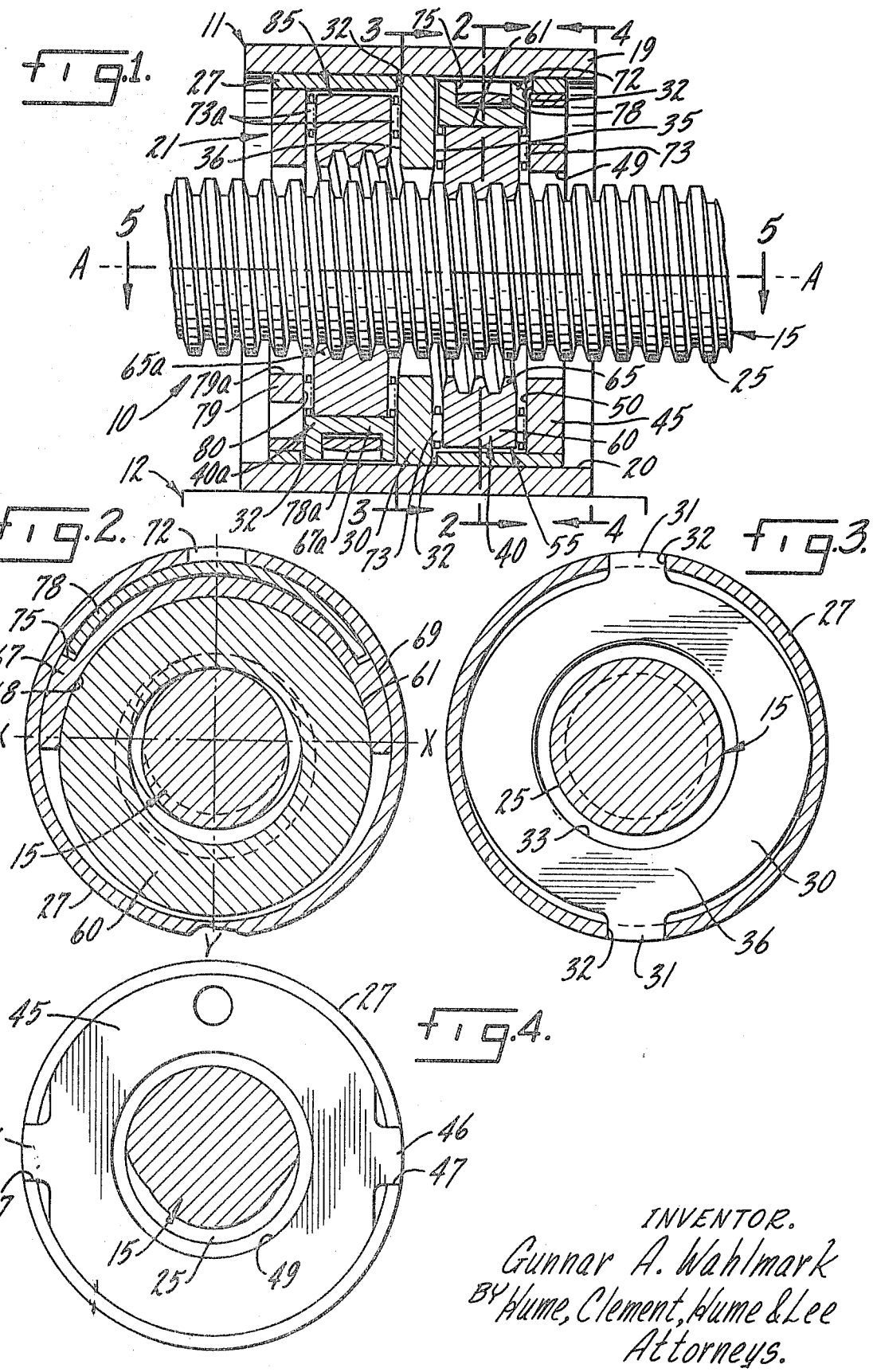

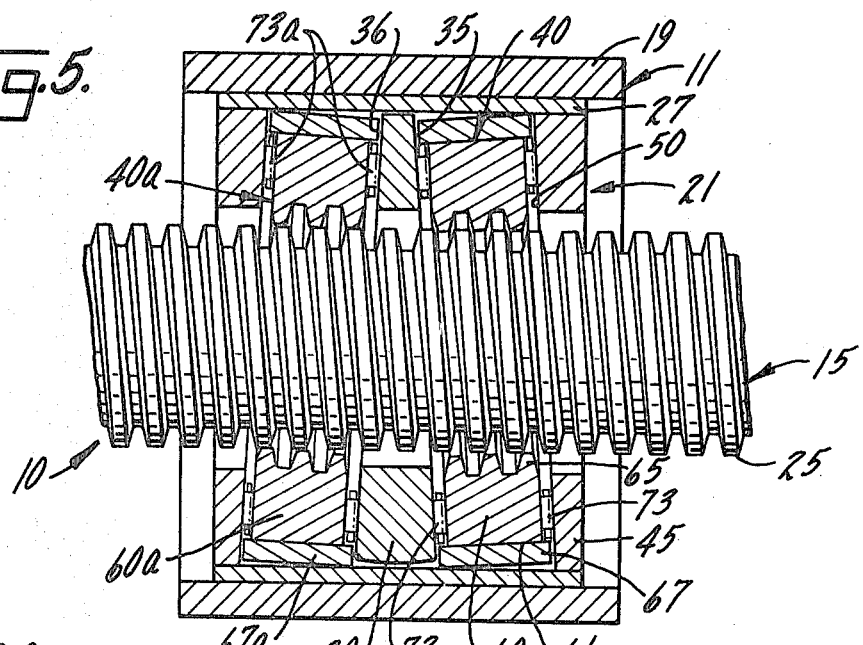
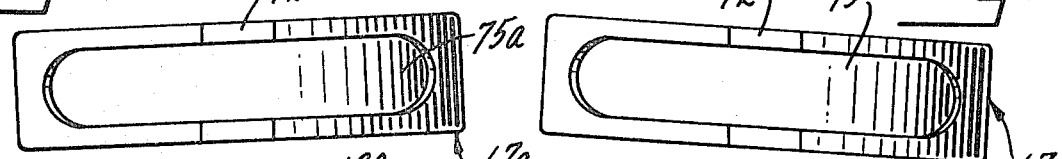
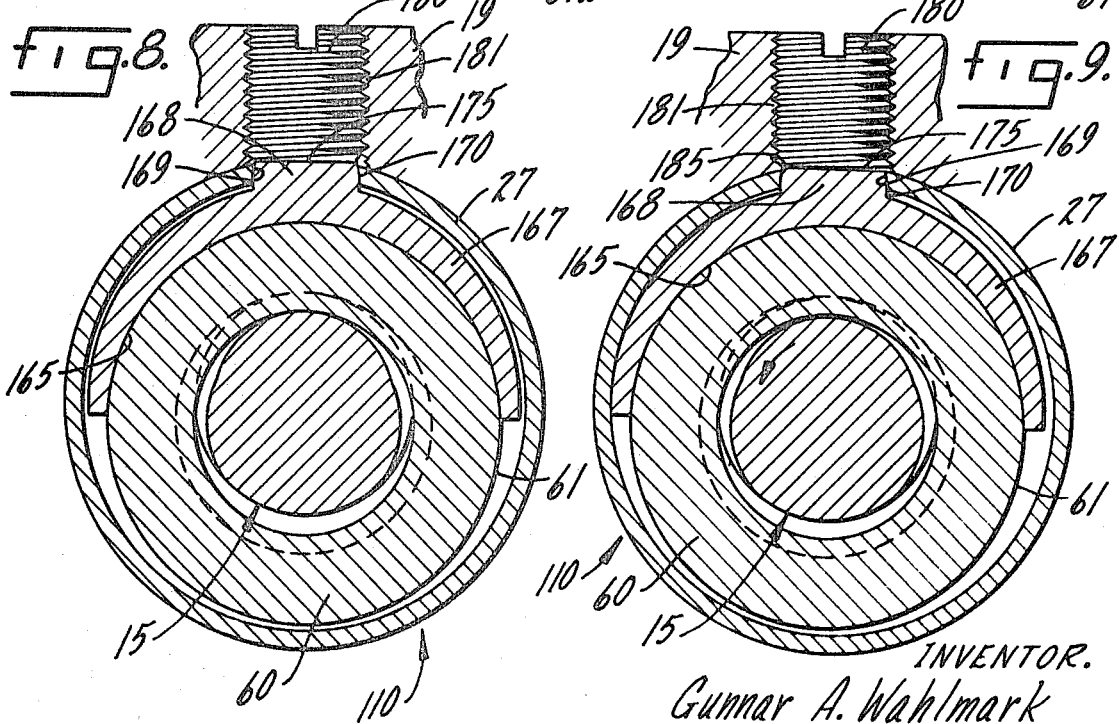

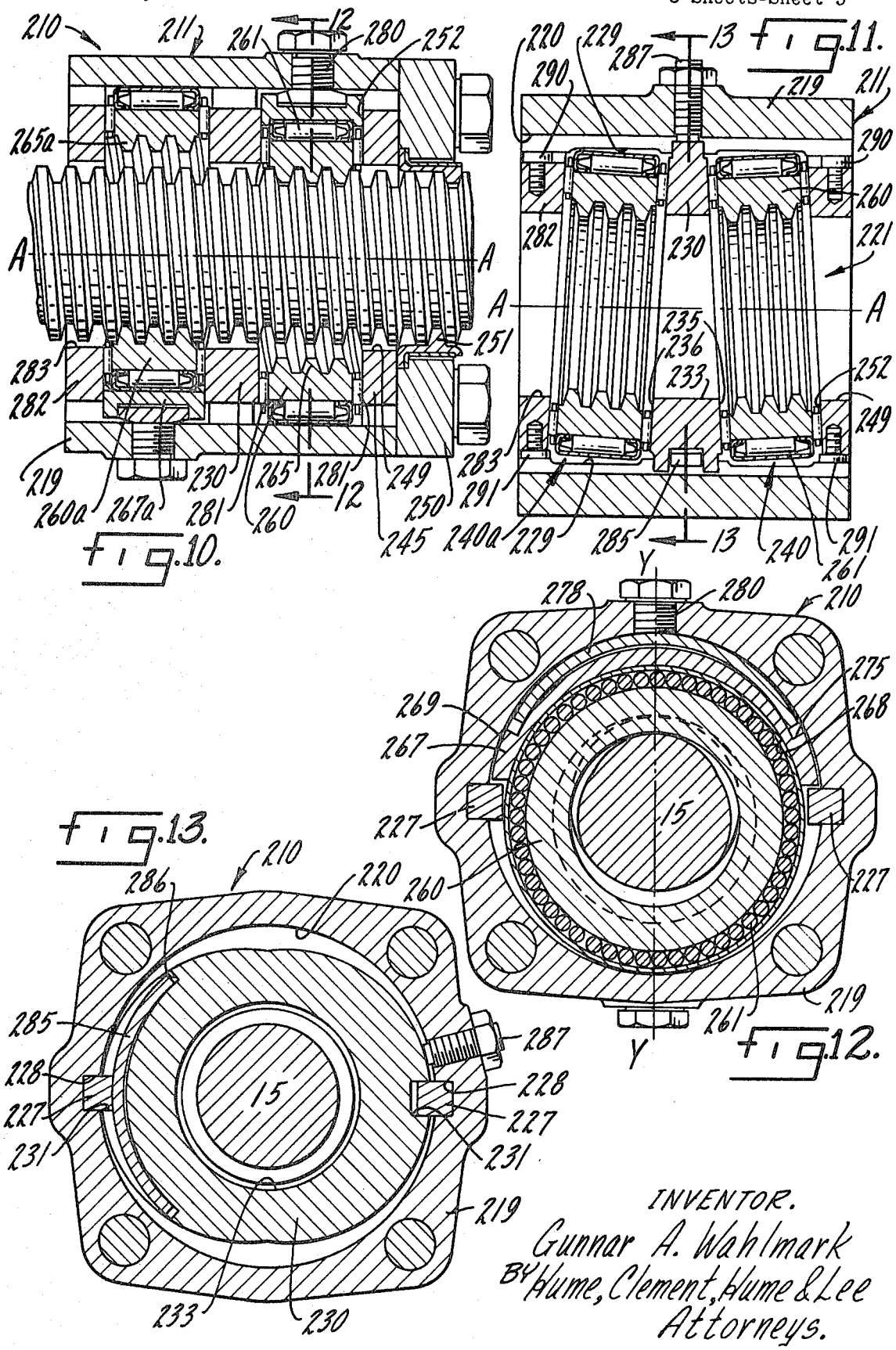

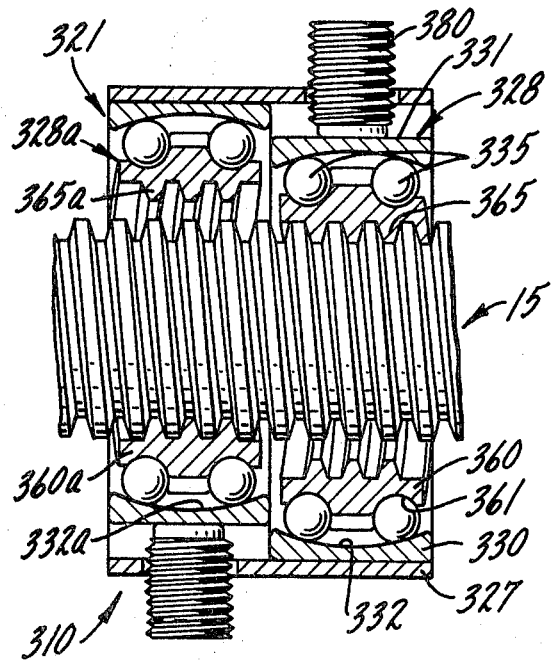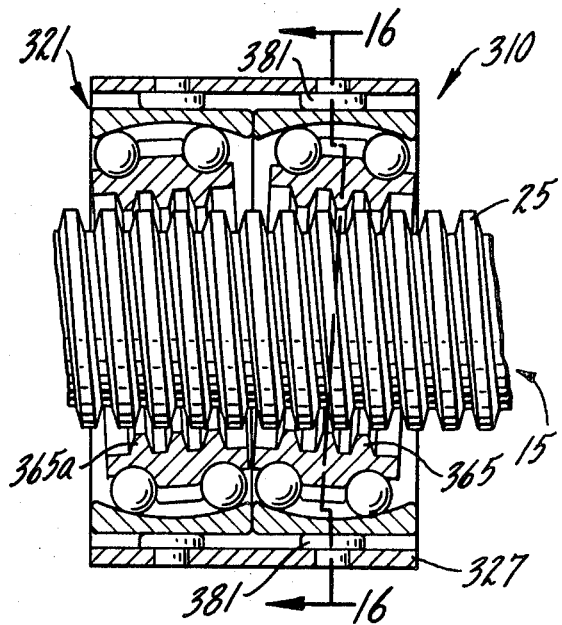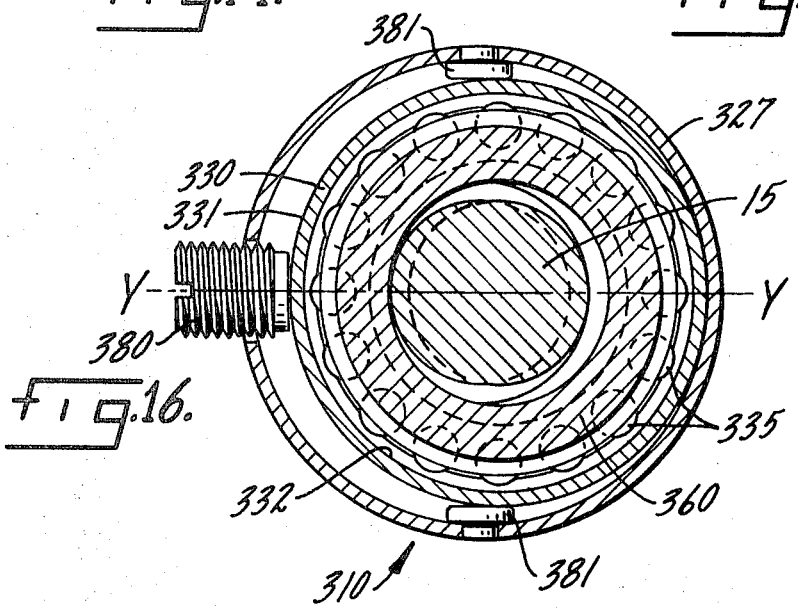

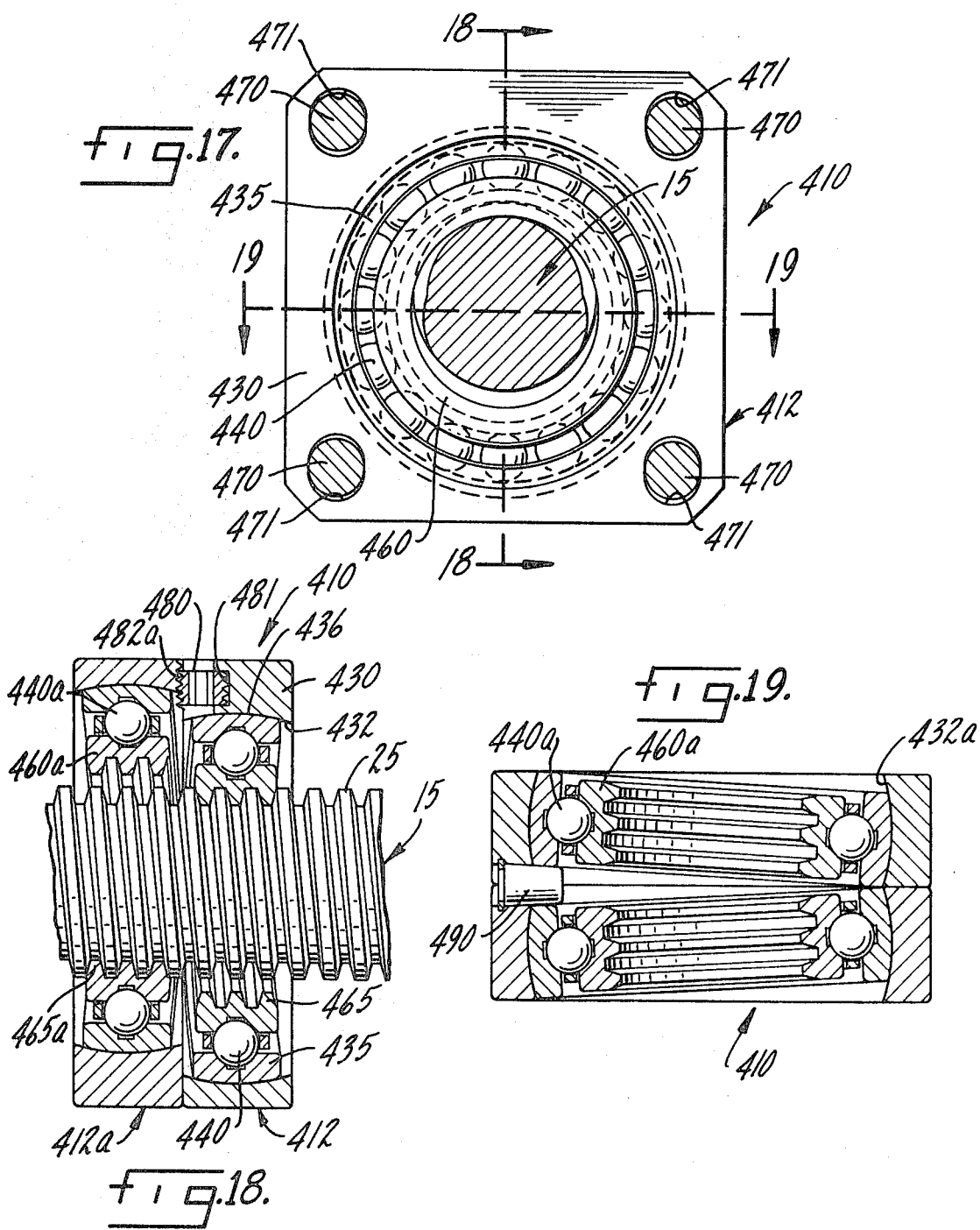

3,614,900
ANTI-FRICTION DRIVE
Gunnar A. Wahlmark, Grand Detour, Ill., assignor to Wahlmark Systems, Inc., Chicago, Ill.
Filed May 8, 1970, Ser. No. 35,762
Int. Cl. F16h *1/20, 55/22*
U.S. Cl. 74—424.8     12 Claims

ABSTRACT OF THE DISCLOSURE

A screw type anti-friction transmission device. The drive screw extends through a driven housing including a foce transmission cartridge. Thread engaging rings are mounted for rotation on bearings within the cartridge and are radially urged into engagement with the screw thread at 180-degree displaced points to forestall backlash.

BACKGROUND OF THE INVENTION

This invention relates to an anti-friction device and more particularly to an anti-friction transmission. The anti-friction transmission is an improvement over that disclosed in applicant's Pat. No. 2,616,302, issued Nov. 4, 1952, entitled Anti-friction Transmission.

The anti-friction transmission disclosed in the aforementioned Wahlmark patent was designed to provide a screw-type transmission having a low frictional loss. In this earlier transmission, a standard screw extends through a three piece mounting block which might be secured to the work carrying table of a machine tool. A pair of axially spaced, annular recesses formed within the block mount annular thread engaging rings for rotational movement in corresponding recesses and rolling engagement with the threads. The recesses are arranged eccentrically to the axis of the screw within the block and the thread engaging rings contact opposite sides of the screw. Rotation of the screw transmits force to and, accordingly, drives the mounting block and the work table through the "rolling" rings within the block, all with a very low friction loss.

In order to minimize backlash, an important factor in a power transmission device of the screw type, shims are disposed in one of the two recesses to facilitate varying the spacing between the axially displaced screw engaging rings. The shims are introduced when the transmission is assembled, however, and provide no automatic take-up of backlash in the transmission during the service life of the transmission; as wear occurs, for example.

SUMMARY OF THE INVENTION

The improved anti-friction transmissions of the present invention utilize a simplified radial adjustment of the screw engaging rings, either on the helix angle of the threads or perpendicular to the screw axis, to forestall backlash in the transmission, thus providing greatly improved anti-friction transmission of the screw type. As such, it is an object of the invention to provide a screw type, anti-friction transmission which affords automatic or a more simplified manual backlash take-up. It is another object to provide a vastly improved, simpler and less expensive anti-friction transmission unit.

The foregoing and other objects are realized in accord with the invention by providing an anti-friction transmission unit wherein a housing for the unit defines two or more axially spaced recesses within the housing. The recesses, in turn, contain rotatable, thread engaging rings mounted on bearings. The rings are urged radially into engagement with threads of the screw on opposite sides of the screw by backlash take-up means.

In a first form of anti-friction transmission unit embodying features of the invention, the housing actually defines a straight cylinder which receives an internal mechanism cartridge. The cartridge, in turn, defines the axially spaced recesses between spacers of suitable configuration. The thread engaging rings are mounted between these spacers and face bearings so that the spacers, face bearings, and rings are nested together as a unit within the cartridge and the housing.

In one variation of this form of the invention, spring loaded bearing means acting radially of the cartridge housing on the thread helix angle are constantly effective on the corresponding thread engaging rings to urge them into intimate engagement with the rotating, power-driven screw. In another variation, particularly suitable where high loads are encountered in transmission of the force from the screw through the unit to the work table, a fork bearing member is radially adjusted by screw adjustment against each ring. As load increases and, correspondingly, the potential backlash theat increases, the rings and cooperating fork bearing members exert increasing radial pressure on the rings to forestall backlash.

In a second form of the invention, thread engaging rings are also mounted between spacers and face bearings which define axially spaced recesses within the housing. In this form of the invention, however, not only are the rings urged radially on the thread helix angle into engagement with the threads of the screw, but adjustment of the spacers is faciltiated to (1) automatically accommodate inaccuracies in the screw threads and (2) increase or decrease the width of the recesses to thus provide for slight width variations in the ring and face bearings or in the housing length. This adjustment facilitates manufacture of components to much less stringent tolerances and, accordingly, less expensively.

In a third form of transmission unit embodying features of the present invention, the thread engaging rings are mounted for rotation within corresponding retainer rings, each on annularly disposed, radially spaced sets of ball bearings. The bearings ride within each retainer ring on a segmentally spherical inner surface so that the thread engaging rings automatically establish themselves at the requisite helix angle for precise engagement with the screw threads. Anti-friction take-up is effected solely by radially adjusting the retainer rings with adjustment screws through the cartridge casing.

In a fourth form of transmission unit embodying features of the invention, a series of separate housing sections are nested together, the number varying with the amount of load to which the anti-friction drive will be subjected. Each housing section contains a retainer ring having a segmentally spherical outer bearing surface slidable on a correspondingly segmentally spherical inner bearing surface in the housing section. A thread engaging ring is mounted for rotation within each retainer ring on an annular series of ball bearings disposed within the two rings. "45-degree contact" is effected between the ball bearings and corresponding races on the retainer and thread engaging rings so that excellent thrust capacity is obtained in both directions of thrust. The retainer rings automatically adjust universally within corresponding housing sections to the helix angle of the screw so that precise engagement of the thread engaging rings with the screw threads is obtained. A wedge pin is provided between adjacent retainer rings to assure that they remain at the proper thread helix angle. Radial adjustment and anti-friction take-up of the thread engaging rings is effected solely by radially adjusting the housing sections relative to each other.

BRIEF DESCRIPTION OF THE DRAWINGS

The invention, including its construction and method of operation, along with other objects and advantages thereof, is illustrated more or less diagrammatically in the drawings, in which:

FIG. 1 is a vertical sectional view taken longitudinally of the screw type, anti-friction transmission unit embodying features of one variation of a first form of the present invention;

FIG. 2 is a sectional view taken along line 2—2 of FIG. 1;

FIG. 3 is a sectional view taken along line 3—3 of FIG. 1;

FIG. 4 is a sectional view taken along line 4—4 of FIG. 1;

FIG. 5 is a horizontal sectional view of the unit of FIG. 1, taken longitudinally of the screw;

FIG. 6 is a bottom plan view of one of the radial bearings in the unit;

FIG. 7 is a top plan view of the opposed radial bearing in the unit;

FIG. 8 is a vertical sectional view similar to FIG. 2, taken transversely through a unit incorporating features of another variation of the first form of the invention; with the unit in a no-load condition;

FIG. 9 is a view similar to FIG. 8, with the unit components depicted as they would appear with the screw turning and the unit under load;

FIG. 10 is a vertical sectional view taken longitudinally of the screw type, anti-friction transmission embodying features of a second form of the present invention;

FIG. 11 is a horizontal sectional view taken longitudinally through the transmission unit of FIG. 10;

FIG. 12 is a sectional view taken along line 12—12 of FIG. 10;

FIG. 13 is a sectional view taken along line 13—13 of FIG. 11;

FIG. 14 is a vertical sectional view taken longitudinally of a screw type, anti-friction transmission unit embodying features of a third form of the invention;

FIG. 15 is a horizontal sectional view of the unit of FIG. 14 taken longitudinally of the screw;

FIG. 16 is a sectional view taken along line 16—16 of FIG. 15;

FIG. 17 is an end elevational view of a screw-type, anti-friction transmission unit embodying features of a fourth form of the present invention;

FIG. 18 is a vertical sectional view taken along line 18—18 of FIG. 17; and

FIG. 19 is a horizontal sectional view taken along line 19—19 of FIG. 17.

DESCRIPTION OF THE PREFERRED EMBODIMENTS

Referring now to the drawings, and particularly to FIGS. 1 and 5, one variation of a first form of screw type, anti-friction transmission unit is illustrated generally at 10. The transmission unit 10 includes a generally cylindrical housing 11 which is securely mounted on the work table 12 of a machine tool, for example, by conventional machine bolts (not shown). The transmission unit 10 includes a power driven screw 15 which, by being rotated on its axis A, is adapted to move the work table 12 axially in either direction relative to the screw.

This power transmission is accomplished with a minimum of friction loss in the unit 11 and no backlash when the travel of the work table is stopped or the direction of travel reversed by counter-rotation of the screw 15. In practice, the friction losses in the unit 11 are so low that power transmission which is ninety-eight percent efficient from the screw 15 to the work table 12 is accomplished.

The housing 11 of the unit 10 includes an outer casing 19 having a cylindrical bore 20 extending longitudinally therethrough. Seated in this bore 20 is a cartridge assembly 21 which forms the "guts" of the anti-friction transmission unit 10 embodying features of the invention. The cartridge assembly 21 cooperates with the screw 15 to provide the virtually friction-free, anti-backlash drive characteristic of this invention.

The screw 15, which extends from its drive means (not shown), is of a standard construction. In the present illustration, the screw 15 has a lead which provides a helix angle of approximately three and one-half degrees to the threads 25. The axis A of the screw 15 is, in operation of the anti-friction drive unit 10, disposed on the axial centerline of the casing 19 and, accordingly, on the corresponding centerline of the cartridge assembly 21.

The cartridge assembly 21 includes a cylindrical outer sleeve 27 having an outside diameter substantially equal to or only slightly less than the inside diameter of the bore 20 through the casing 19. Accordingly, the sleeve 27 is adapted to slide freely but snugly into the casing 19 in the manner illustrated in FIGS. 1 and 5.

As best seen in FIGS. 1, 3 and 5, an annular spacer disc 30 is mounted within the sleeve 27 intermediate its ends. The configuration of the outer periphery of the disc 30 corresponds generally to the inside of the sleeve 27, with the exception of upper and lower ears 31 formed on the disc which extend into corresponding, radially extending, axially elongated slots 32 in the sleeve 27. With the disc 30 in position within the sleeve 27, the ears 31 lock in the slots 32 to prevent rotation of the disc within the sleeve 27. The disc 30 has a central passage 33, of diameter substantially greater than the outside diameter of the screw 15, which extends through it.

FIGS. 1 and 5 best illustrate the configuration of the spacer disc 30 and its opposite planar faces 35 and 36. For reasons which will hereinafter be discussed in detail, the planar face 35 is formed so as to be disposed at the helix angle to a plane perpendicular to the axis A in horizontal (see FIG. 5) direction. Accordingly, as seen in horizontal section in FIG. 5, the face 35 of the disc 30 is inclined in the direction of lead of, and at the helix angle of, the helical threads 25 on the screw 15.

The opposite face 36 of the disc 30 is also inclined, in horizontal section, as seen in FIG. 5, at the helix angle of inclination. However, the inclination of the face 36 is opposite the direction of lead of the threads 25, at substantially the helix angle to a plane perpendicular to the axis A.

Seated against the opposite faces 35 and 36 of the spacer disc 30, within the sleeve 27, are identical screw engagement ring sub-assemblies 40 and 40a, oriented 180 degrees to each other about the axis A. Since the ring sub-assemblies 40 and 40a are identical in construction, only the sub-assembly 40 is described in detail and corresponding reference numerals with the affix "a" are applied to corresponding components of the ring sub-assembly 40a. In this light, it will be noted in FIG. 5 that in horizontal section the angular arrangement of the ring sub-assembly 40a within the sleeve 27 relative to a plane perpendicular to the axis A is opposite that of the ring sub-assembly 40. The significance of this arrangement will hereinafter be elicited in the discussion of the operation of the anti-friction drive unit 10.

Locking the ring sub-assembly 40 in the sleeve 27 and against the face 35 of the spacer dis 30 is an end closure disc 45, best seen in FIGS. 1, 4 and 5. The outer periphery of the disc 45 corresponds generally to the inside of the sleeve 27, except that it fits more snugly within the sleeve than the spacer disc 30, as will be recognized in a comparison of their relative configurations in FIGS. 3 and 4.

Further, unlike the spacer disc 30, the end closure disc 45 has side ears 46 formed thereon and extending radially therefrom into a radially disposed slots 47 in the sleeve. With the disc 45 in position within the sleeve 27, the ears 46 lock in the slots 47 to prevent rotation of the disc 45 within the sleeve 27. The disc has a central passage 49, of a diameter substantially greater than the outside diameter of the screw 15, which extends through it. Suitable snap ring or threaded nut means (not shown) are employed to hold the disc 45 in the sleeve 27 and, accordingly, retain the ring sub-assembly 40 between the spacer disc 30 and the end closure disc 45.

The ring sub-assembly 40 bears against the inner face 50 of the end closure disc 45. The inner face 50 is planar and formed so as to be disposed, when in position in the sleeve 27, parallel to the opposed face 35 of the spacer disc 30. Accordingly, a chamber 55 is defined between the disc faces 50 and 35, with the ring sub-assembly 40 disposed in the chamber; the chamber and the ring sub-assembly being canted at the thread helix angle to a plane perpendicular to the axis A of the screw 15 on the horizontal axis X (see FIG. 2).

The ring sub-assembly 40 includes a screw engaging ring 60. The ring 60 has an annular outer bearing surface 61 which is of substantially lesser diameter than the inside of the sleeve 27. The ring 60 is, in turn, internally ribbed at 65 on a diameter substantially greater than the pitch diameter of the threads 25 on the screw 15. The internal ribs 65, in the ring 60 have no lead but are otherwise formed with a cross-sectional configuration corresponding to the threads 25.

According to the invention, the screw engaging ring 60 is urged downwardly on the thread 25 helix angle against the screw 15 on the vertical or Y-axis of the ring sub-assembly 40, as illustrated in FIG. 2, by a spring loaded yoke bearing 67. The yoke bearing 67 is seen in top plan view in FIG. 7. The yoke bearing 67 is generally crescent shaped, having a segmentally cylindrical inner bearing surface 68 corresponding in radius to the annular outer bearing surface 61 of the ring 60 and a segmentally cylindrical outer surface 69 corresponding substantially in radius to the annular inner surface of the sleeve 27.

A circumferentially extending depression 75 is formed in the outer surface 69 of the yoke bearing 67 so as to define a correspondingly oriented recess between the yoke bearing and the inner surface of the sleeve 27. Seated in this recess is a segmentally circular leaf spring 78 which, because its normal radius is substantially less than the radius of the sleeve 27, constantly urges the bearing 67 radially against the ring 60 and, accordingly, the ring snugly against the screw 15 which the ribs 65 in mesh with the threads 25.

In operation of the unit 10, in a manner hereinafter discussed in detail, the ring 60 rotates in the chamber 55 against the bearing surface 68 on the yoke bearing 67 as the screw 15 is rotated. The yoke bearing 67 is prevented from rotating within the sleeve 27 by a radial ear 72 extending through the aforementioned, longitudinally extending slot 32 in the sleeve 27.

Supporting the ring 60 in axial thrust bearing relationship for rotation in the chamber 55 are oppositely disposed face roller bearing units 73. The roller bearing units 73, which are conventional in construction, are disposed between corresponding faces 35 and 50, respectively, of the discs 30 and 45, and the opposed planar side faces of the ring 60. The roller bearing units 73 are, like the ring 60, positioned by the bearing surface 68 so as to always rotate on the same axis as the ring.

The ring sub-assembly 40a is locked in the sleeve 27 against the opposite face 36 of the spacer disc 30 by the opposite end closure disc 79. The outer periphery configuration of the disc 79 is identical to that of the other end closure disc 45 and it has corresponding side ears (not shown) formed thereon and extending radially therefrom into radially disposed slots (not shown) in the sleeve 27. The disc 79 has a central passage 79a extending through it identical in diameter to the correponding passage 49 through the disc 45. Once again, suitable screw or snap ring means (not shown) retains the disc 79 in the sleeve 27 and, accordingly, retains the ring sub-assembly 40a between the spacer disc 30 and the end closure disc 79.

The inner face 80 of the end closure disc 79 is planar and formed so as to be disposed, when in position in the sleeve 27, parallel to the opposed face 36 of the spacer disc 30. Accordingly, a chamber 85 similar to the aforedescribed chamber 55 is defined between the disc faces 80 and 36, with the ring sub-assembly 40a disposed in the chamber 85. The chamber 85 and the ring sub-assembly 40a are canted on the Y-axis at the helix angle from a plane perpendicular to the screw axis A in a direction opposite to that of the chamber 55 and the ring sub-assembly 40.

The opposite orientation of the ring sub-assembly 40a, and the chamber 85 in which it is retained, is occasioned by the fact that the screw engaging ring 60a of the ring sub-assembly 40a is urged into engagement with the threads 25 of the screw 15 on the bottom of the screw, as illustrated in FIG. 1. The angular orientation of the thread 25 is, of course, the reverse on the bottom of the screw to what it is on the top of the screw where the ring 60 makes its engagement and, to effect intimate meshing of the ribs 65a with the threads 25, an opposite orientation of the ring 60a is required.

To achieve such intimate engagement, the yoke bearing 67a is disposed at the bottom of the chamber 85, as illustrated in FIG. 1. The bearing 67a is seen in bottom plan view in FIG. 6. In all other respects, however, the construction, arrangement and operation of the ring sub-assembly 40a in the chamber 85 is identical to that of the ring sub-assembly 40 in the chamber 55.

In operation of the screw type, anti-friction transmission unit 10 of the present invention, the screw 15 is rotated on the axis A by its prime mover. It will thus be seen that oppositely disposed (relative to the axis A) points on the internal ribs 65 and 65a of the rings 60 and 60a, which points are in mesh with corresponding points on the thread 25 on the screw 15, travel to the right or left, depending upon the direction of rotation of the screw, a distance corresponding to the lead of the thread 25 in each rotation of the screw. After each of the ribs 65 and 65a has moved through a certain arc, the ribs at that point become separated from the thread 25 and this separation reaches its greatest extent 180-degrees removed from the point of closest mesh. The unit 10 continues to travel in the same direction due to the fact that some point on each of the ribs 65 and 65a engages the thread 25 at all times and, accordingly, is being moved by the rotation of the screw 15.

The screw engaging rings 60 and 60a are free to rotate with the rotation of the screw 15. The rings are supported for virtually frictionless rotation in axial thrust bearing relationship on the roller face bearing units 73 and 73a. Only minimal radial forces are exerted in the unit 10 by rotation in the screw 15 and, accordingly, the rotation of the thread engaging rings 60 and 60a in radial bearing relationship on the yoke-bearing surfaces 68 and 68a is also minimal. Frictional losses in a transmission unit 10 are so low, in fact, that efficiencies of in the neighborhood of ninety-eight percent are achieved, as has been pointed out.

At the same time, "backlash" of the unit 10 when the screw 15 stops, starts, and reverses direction is obviated because the leaf springs 78 and 78a constantly urge the corresponding thread engaging rings 60 and 60a into intimate engagement with the threads 25 (at positions 180-degrees displaced about the axis A on the threads 25) of the screw 15. Since the ribs 65, 65a and screw threads 25 have standard, truncated V-thread configurations in cross-section, this radial urging of the ribs and thread into mesh eliminates all play between the screw 15 and the rings 60 and 60a and, according to the invention, obviates backlash entirely.

The aforedescribed variation of the invention is suitable for virtually all machine tool operations, for example, where it finds highly advantageous application. In such applications, the loads encountered are not great, as might be expected where movement of a work table is effected and the work table is mounted for horizontal movement on anti-friction bearings. Where high loads are encountered in machine operation and a low friction, anti-backlash drive is desirable, another variation of the invention finds effective application. Attention is directed to FIGS. 8 and 9 for illustration of this variation of the screw type anti-friction transmission unit, only portions of which are shown at 110.

The anti-friction transmission unit 110 is identical in all respects to the unit 10 hereinbefore discussed except for the manner in which the thread engaging rings 60 and 60a (the latter not shown) are urged radially to obviate any tendency to backlash. Referring specifically to FIG. 8, the bearing yoke 167 is seen here bereft of a spring retaining recess and, instead, is provided with a radially disposed base leg 168 which extends through an enlarged aperture 169 in the sleeve 27.

The aperture 169 has a segmentally spherical internal surface which corresponds in configuration to the annular external surface 170 on the leg 168 and is slightly larger in diameter than the surface 170. Accordingly, the leg 168 is loosely retained in the aperture 169 with its planar thrust surface 175 extending slightly outside the sleeve 27.

The yoke 167 is radially adjusted by a set screw 180 threaded through a suitably formed, internally threaded passage 181 in the casing 19 of the unit 10. As will be seen, by turning the set screw 180 the yoke 167 bearing surface 165 is thrust against the annular bearing surface 61 on the ring 60.

In operation, the set screw 180 is adjusted to snugly but lightly urge the yoke 167 against the ring 60 and, consequently, the ring against the threaded shaft 15, all with the unit at rest, as seen in FIG. 8. When the shaft 15 is rotated, as seen in FIG. 9, in a relatively high load environment, the greater the load the greater the tendency of the shaft 15 and cartridge 21 to move axially relative to each other, with concomitant backlash.

This relative movement is forestalled, however, in the unit 110, because rotation of the shaft 15 against high load urges the yoke radially off-center, causing it to "tip" about one edge of its thrust surface 175, as seen at 185. This tipping, in turn, forces the yoke radially inwardly, bringing greater radial bearing force to bear on the ring 60 and urging it more forcefully into engagement with the shaft 15. Any incipient backlash is thus automatically taken up or forestalled.

The simple construction and assembly of the cartridge assemblies facilitates fabrication of the units 10 and 110 inexpensively. The cartridge assembly components are easily slipped within their retaining sleeves in nested relationship. The cartridge is then slipped, as easily, into its casing and snap-ringed in place. Unit costs are greatly reduced over known devices of this type.

The construction of the unit 10 and 110 also assures self-alignment of the screw-engaging rings 60 and 60a with the axis of the screw 15. More precisely, the rings 60 and 60a move radially on the helix angle to follow the screw and assure intimate engagement with it at all times.

Turning to FIGS. 10–13, a second form of screw type, anti-friction transmission unit embodying features of the present invention is illustrated generally at 210. The transmission unit 210 is broadly similar to the basic unit 10 hereinbefore described in detail. Besides being somewhat simpler to assemble, however, it provides several highly desirable features, including automatic accommodation of inaccuracies in the screw threads 25 on the drive screw 15 and simple adjustment of the housing length to accommodate slight variations in the width of the screw engaging rings. This assures that both rings carry the load uniformly.

The transmission unit 210 includes a housing 211 defined by a casing 219 having a generally cylindrical bore 220 extending therethrough. Seated in this bore is the cartridge assembly 221 which, once again, forms the "guts" of the unit.

The cartridge assembly 221 includes an oppositely disposed pair of "key" members 227 extending longitudinally of the bore 220, on opposite sides thereof, along its length, and seated in suitably formed recesses 228 in the sides of the bore 220. The keys 227 extend radially into the bore 220 itself, and have irregularly formed inner surfaces 229 to provide suitable clearances for cartridge assembly 221 components.

An annular spacer disc 230 is mounted within the bore 220 intermediate its ends. As best seen in FIG. 13, the outer periphery of the disc 230 corresponds generally to the inside of the bore 220, albeit flattened somewhat on upper and lower surfaces. On its opposite sides, the disc 230 has suitably formed slots 231 for receipt of the key members 227. It will thus be seen that the disc 230 is actually mounted on and fixed against rotation within the bore 220 by the key members 227. The disc 230 has a central passage 233, of diameter substantially greater than the outer diameter of the screw 15, which extends through it.

FIGS. 10 and 11 best illustrate the configuration of the spacer disc 230 and its opposite planar faces 235 and 236. Insofar as the configuration and relative orientation of the opposite planar faces 235 and 236, in this regard, it is identical to the disc 30 hereinbefore discussed in detail in relation to the unit 10 of the first form of the invention.

Seated against the opposite faces 235 and 236 of the spacer disc 230, within the bore 220, are identical screw engagement ring sub-assemblies 240 and 240a, orientated 180 degrees to each other about the axis A of unit 210. Once again, only one of the ring sub-assemblies, ring sub-assembly 240, is described in detail, and corresponding reference numerals applied to corresponding components of the ring sub-assembly 240a, since they are substantially identical in construction.

Locking the ring sub-assembly 240 in the bore 220 and against the face 235 of the spacer disc 230 is an end closure disc 245. The configuration of the outer periphery of the disc 245 corresponds generally to that of the disc 230 and, like the disc 230, the disc 245 is suitably slotted (not shown) to slidably mount on the key members 227. The disc 245 has a central aperture 249, of a diameter substantially greater than the outside diameter of the screw 15 which extends through it. A cover plate 250 is bolted to the end of the casing 219, over the disc 245, and bears against it to retain the disc in the bore 220. A screw seal 251 is mounted on the annular inner periphery of the plate 250 and engages the threads 25 of the screw 15 in a well-known manner to provide a conventional sealing effect.

The ring sub-assembly 240 is mounted for rotation between the inner face 252 of the disc 245 and the face 235 of the spacer disc 230. The ring sub-assembly 240 includes a screw engaging ring 260. The ring 260 has an outer diameter substantially less than the inside diameter of the bore 220, and carries on its outer periphery a conventional circular torrington roller bearing assembly 261. The ring 260 is internally ribbed at 265 on a diameter substantially greater than the pitch diameter of the thread 25. The ribs 265, once again, have no lead.

According to the invention, the screw engaging ring 260 is urged downwardly on the thread helix angle against the screw 15 on the vertical or Y-axis of the ring sub-assembly 240, as illustrated in FIG. 12, by a spring loaded yoke bearing 267. The yoke bearing 267 is generally crescent-shaped, having a segmentally cylindrical inner bearing surface 268 corresponding in radius to the outer diameter of the torrington bearing assembly 261, and a segmentally cylindrical outer surface 269 corresponding in radius to the annular inner surface of the bore 220.

A circumferentially extending depression 275 is formed in the outer surface 269 of the yoke bearing 267 and, seated in this depression is a segmentally circular leaf spring 278. The leaf spring 278 constantly urges the bearing 267 radially against the torrington bearing assembly 261 and, accordingly, the ring 260 snugly against the screw 15. As the ring 260 rotates, the yoke bearing 267 is prevented from rotating within the bore 220 by its impingement, at opposite ends, with the key elements 227, as best seen in FIG. 12. The amount of spring pressure applied to the ring 260 can be varied by adjusting the screw 280 in the casing 219 to increase or decrease pressure on the leaf spring 278. The ring 260 is supported in axial thrust bearing relationship on oppositely disposed torrington thrust bearing assemblies 281 of conventional construction. The bearing assemblies 281 are centered with the ring 260.

The ring sub-assembly 240a is locked in the bore 220 against the opposite face 236 of the spacer disc 230 by the opposite end closure disc 282. The configuration of the disc 282 is substantially identical, in mirror image relationship, to that of the disc 245. It is, in turn, mounted within the bore 220, on the key members 227, and has a central passage 283 extending therethrough. A cover plate (not shown) identical to the cover plate 250 is provided to retain the disc 282 and, accordingly, the cartridge 212, in the bore 220.

Like the ring sub-assembly 40a hereinbefore discussed in relation to the unit 10, the opposite orientation of the ring sub-assembly 240a to that of the ring sub-assembly 240 is occasioned by the fact that the screw engaging ring 260a of the ring sub-assembly 240a is urged into engagement with the threads 25 of the screw 15 on the bottom of the screw, as illustrated in FIG. 10. Angular orientation of the thread 25 once again dictates an opposite orientation of the ring 260a. To achieve intimate engagement of the ring 260a with the screw 15, the yoke bearing 267a is disposed opposite the yoke bearing 267 from the axis A, as also illustrated in FIG. 10. In all other respects, however, the construction, arrangement and operation of the ring sub-assembly 240a is identical to that of the ring sub-assembly 240.

The anti-friction drive unit 210 provides all the advantageous features of the basic unit 10, with certain important advantages. First, as best seen in FIGS. 11 and 13, the central disc 230 can be adjusted transversely of the bore 220 to provide automatic take-up for slight inaccuracies in screw thread 25. To this end, a leaf spring 285 is seated in a suitably formed depression 286 on one side of the outer periphery of the disc 230. This leaf spring 285, which passes through a notch (not shown) in a corresponding key member 227, constantly urges the disc 230 the opposite direction, transversely of the bore 220; that is, seeking to wedge the ring sub-assemblies 240 and 240a farther apart. The extent to which this wedging apart of the ring sub-assemblies 240 and 240a can be effective is determined by a set screw 287 extending through the casing 219 opposite the leaf spring 285, and into engagement with the periphery of the disc 230, as best seen in FIG. 11. By suitable adjustment of the set screw 287, an exact adjustment for near zero clearance axially in the unit 210 can be made after assembly. Thus, the original machining and manufacture of the components can be considerably less precise, resulting in much lower costs.

Second, when the unit 210 is assembled, the transverse positioning of the end closure discs 245 and 282 can be varied by adjusting position screws 290 and 291 on opposite sides of corresponding discs. By doing this, because of the wedge configuration and effect of the movement of the discs 245 and 282 transversely in the bore 220, the effective housing length can be adjusted minutely. Accordingly, precision machining of components is further reduced since this adjustment can be done at the time of assembly (or subsequently, by extending screws 290 and 291 through the housing) and cost savings of substantial amounts afforded.

Turning now to FIGS. 14–16, an anti-friction transmission unit embodying features of a third form of the invention is illustrated generally at 310. In the unit 310, a suitable cylindrical housing (not shown) contains a cartridge assembly 321, which cooperates with the screw 15 to, once again, provide virtually friction-free, anti-backlash drive between the screw and the housing.

The cartridge assembly 321 includes a cylindrical outer sleeve 327. Mounted within the sleeve is a pair of identical cartridge sub-units 328 and 328a, in side-by-side relationship. Since these sub-units 328 and 328a are identical in construction, only the sub-unit 328 will be described in detail and corresponding reference numerals with the suffix "a" applied to corresponding components of the sub-unit 328a.

The cartridge sub-unit 328 includes a generally cylindrical retainer ring 330 having a circular cylindrical outer surface 331 with an outer diameter somewhat less than the inside diameter of the sleeve 327. The inner surface 332 of the ring 330 is segmentally spherical in configuration and has an inside diameter substantially greater than the diameter of the screw 15 extending through it.

Mounted for rotation within the retainer ring 330 on two axially spaced series of ball bearings 335 is a thread engaging ring 360. Suitably formed outer races 361 on the ring 360 receive corresponding series of the roller bearings 335 within which the ring 360 rotates about the axis of the screw 15.

The ring 360 is internally ribbed at 365 on a diameter substantially greater than the diameter of the threads 25 on the screw 15. The internal ribs 365 in the ring 360 have, once again, no lead, but are otherwise formed with a cross-sectional configuration corresponding to the threads 25.

According to the invention, the screw engaging ring 360 is urged against the screw 15 on (in the present illustration) the horizontal axis Y, as illustrated in FIG. 16, by a set screw 380 threaded through a suitably formed, internally threaded passage (not shown) in the housing of the unit 310. As will be seen, by turning the set screw 380, which bears against the outer surface 331 of the retainer ring 330, the ring 330 and, accordingly, the thread-engaging ring 360 are moved toward the threads 25 of the screw 15. The ring 330 moves between centering guide buttons 381 suitably mounted within the casing 327 on opposite sides of the ring 330.

In operation, the set screw 380 is adjusted to urge the ribs 365 of the thread-engaging ring 360 against the threads 25 of the screw 15. In this way, all radial and axial play is eliminated by adjustment and any threat of backlash is obviated.

Because the thread-engaging rings 360 and 360a are mounted on ball bearings within segmentally spherical chambers; in effect, defined by the inner surfaces 332 and 332a, respectively, of the retainer rings, the thread-engaging rings 360 and 360a are free to rotate on the vertical axis (in the present illustration) and precisely align themselves with the helix angle if the threads 25, in engagement with these threads at 180-degree displaced positions on the threads. Thus, a unit constructed according to this design is readily adaptable to a screw 15 having threads 25 of one lead angle or another. If "double lead" threads are employed, it is only necessary to make the retainer rings 330 somewhat wider so that the maximum permissible angle of tilt of the retainer rings 330 in their segmentally spherical retaining surfaces 332 is increased.

Referring now to FIGS. 17–19, a fourth form of anti-friction transmission unit embodying features of the present invention is illustrated generally at 410. The unit 410 comprises a series of independent sections 412 nested together in side-by-side relationship. Only two such sections 412 are shown in this unit 410 but, should higher load carrying capacity be required, additional sections 412 may merely be nested together in the same fashion.

Each section 412 comprises an outer casing 430 having a segmentally spherical inside surface 432 with a diameter substantially greater than the diameter of the threads 25 on the screw 15 which extends through the rings 412. Seated for universal movement inside the casing 430 on the segmentally spherical surface 432 is a retainer ring 435. The outer surface 436 of the retainer ring 435 is segmentally spherical also, with an outside diameter which corresponds to the inside diameter of the surface 432. Accordingly, the retainer ring 435 is seated for universal movement in the casing 430.

Mounted for rotation within the retainer ring 435 on a single series of conventional ball bearings 440 is a thread-engaging ring 460. Conventional 45-degree contact races are formed on the outer surface of the thread-engaging ring 460 and on the inner surface of the retainer ring 435, and the ball bearings 440, retained in a conventional cage, roll in these races.

The thread-engaging ring 460 is internally ribbed at 465 on a diameter substantially greater than the diameter of the threads 25 on the screw 15. The internal ribs 465 in the ring 460 have no lead, once again, but are otherwise formed with a cross-sectional configuration corresponding to the threads 25.

The sections 412, regardless of their number, are held against each other by four transversely extending bolts 470 and nuts (not shown) as seen in FIG. 13. The bolts extend through vertically elongated slots 471 in each of the housing sections 412 so that the housing sections are, to the extent that the slots 471 are slightly elongated vertically, movable relative to each other. It is by this relative movement that the thread-engaging rings are adjusted to snugly engage the threads 25 on the screw 15 at 180-degree removed positions on the screw, thus forestalling any tendency to backlash in operation of the unit 410.

Relative adjustment of the housing section 412 on the bolts 470, with concomitant adjustment of the thread-engaging rings 460 into intimate engagement with the threads 25 on the screw 15, is effected by an adjustment screw 480. The adjustment screw 480 is, as illustrated in FIG. 18, seated for rotation in an unthreaded slot section 481 in the housing section 412. The screw, in turn, meshes with an internally threaded, shallower slot section 482a on the opposite side of the housing section 412a. It will thus be seen that by rotation of the screw 480, adjustment of the sections 412 and 412a relative to each other can readily be made, thus adjusting the pressure of engagement of the thread-engaging rings 460 with the threads 25 on the screw 15.

Similar to the unit 310 hereinbefore discussed, the universal mounting of the retainer ring 435 in the housing section 412 permits it to move angularly into proper relationship with the threads 25 on the screw 15, as seen in FIG. 19, regardless of their helix angle. Once the retainer rings 435, with their rotatably carried thread-engaging rings 460, have assumed the proper angular relationship relative to the screw 15, as seen in FIG. 19, the fourth form of the invention is constructed to facilitate the insertion of a wedge pin 490 into a suitably formed aperture between the sections 412 and 412a so as to lock the retainer rings 435 at this specific angular displacement relative to each other.

In each form of transmission unit embodying features of the invention, it will be recognized that the screw 15 need not be machined to extremely fine tolerances in order to achieve the results desired. The prior art device of Wahlmark's own patent required such fine machining or the use of an undersized screw and the shims hereinbefore described. Furthermore, this prior art device, when subjected to loads greater than its pre-load, would actually provide engagement of the screw threads with its thread engaging rings on only one side of the ribs in one ring, greatly enhancing its disposition to failure.

While several embodiments described herein are at present considered to be preferred, it is understood that various modifications and improvements may be made therein.

What is desired to be claimed and secured by Letters Patent of the United States is:

1. An anti-friction transmission unit, comprising: a housing means,
   (a) a screw having a thread formed thereon,
   (b) said screw extending through said housing means,
   (c) means defining at least a pair of annular chambers axially spaced within said housing means relative to said screw,
   (d) ring means rotatable in each of said chambers and having passages extending therethrough with circumferential rib means formed in said passages,
   (e) said screw extending through each of said passages and said passages having inside diameters greater than the pitch diameter of the thread on said screw,
   (f) said ring means being disposed in said chambers so that corresponding rib means engage said screw thread on opposite sides of the screw axis, and
   (g) means in said housing effective to urge each of said ring means radially toward a corresponding side of said screw so that said rib means are forced into intimate engagement with said screw thread as said screw is rotated on said axis.

2. The transmission unit of claim 1 further characterized in that:
   (a) said ring means are radially shiftable relative to said housing means.

3. The transmission unit of claim 2 further characterized in that:
   (a) said ring means are radially shiftable on the helix angle of the screw thread.

4. The transmission unit of claim 3 further characterized by and including:
   (a) face bearing means on opposite sides of each said ring means radially shiftable therewith and supporting said ring means in axial thrust relationship in each of said chambers.

5. The transmission unit of claim 2 further characterized in that:
   (a) said means in said housing effective to urge said ring means radially toward a corresponding side of said screw includes bearing means for supporting the annular periphery of each of said ring means for rotation thereagainst.

6. The transmission unit of claim 5 further characterized in that:
   (a) said means in said housing effective to urge said ring means radially toward a corresponding side of said screw includes radially resilient means.

7. The transmission unit of claim 6 further characterized by and including:
   (a) anti-friction bearing means disposed between the annular periphery of said ring means and outer bearing race means.

8. The transmission unit of claim 5 further characterized in that:
   (a) said bearing means comprise annularly disposed anti-friction bearings in retainer rings,
   (b) said radial adjustment means being effective on said retainer means to urge said ring means into intimate engagement with said screw thread,
   (c) said ring means being angularly tiltable in corresponding chambers when urged against said screw threads to assure intimate engagement with said screw thread on the helix angle of said thread.

9. The transmission unit of claim 2 further characterized in that:
   (a) said means defining at least a pair of annular chambers axially spaced within said housing means includes a generally circular cylindrical bore extending through said housing,
   (b) said chambers being defined within said bore by a center spacer disc disposed in said bore and extending transversely thereof, and a pair of oppositely disposed, end closure discs extending transversely of said bore.

10. The transmission unit of claim 9 further characterized in that:

(a) said center spacer disc has oppositely disposed side faces lying in converging planes disposed at the helix angle of the screw thread relative to a plane perpendicular to the axis of said screw, (b) each of said end closure discs having an inner face lying in a plane disposed parallel to the opposed side face of said center disc.

11. The transmission unit of claim 10 further characterized in that:

(a) said center spacer disc is radially adjustable in said bore to accommodate inaccuracies in said screw thread.

12. The transmission unit of claim 11 further characterized in that:

(a) at least one of said end closure discs is radially adjustable in said bore to vary the width of said chambers.

References Cited

UNITED STATES PATENTS

| | | | |
|---|---|---|---|
| 2,482,082 | 9/1949 | Wahlberg | 74—424.8 X |
| 2,842,007 | 7/1958 | Brant | 74—459 X |
| 2,940,322 | 6/1960 | Uhing | 74—459 UX |
| 2,961,887 | 11/1960 | Long | 74—424.8 |

ARTHUR T. McKEON, Primary Examiner

U.S. Cl. X.R.

74—459